Patented June 12, 1928.

1,673,311

UNITED STATES PATENT OFFICE.

PIO CACCIA, OF NEWARK, NEW JERSEY.

PRODUCTION OF DIRECT AZO DYESTUFFS.

No Drawing.  Application filed July 20, 1926. Serial No. 123,807.

The object of my invention is the production of direct colors, which can dye cotton and artificial silk only in unions, (mixed in textiles), while the silk will remain white. The artificial silk and cotton will be dyed when in a bath with soap and sodium carbonate or in a bath with Glauber's salt, ($Na_2SO_4$).

It is known that the introduction of substituents into amino-groups in azo dye components is generally accomplished by improved fastness properties; not only that, but the shade will change too as well as the coloring power, which will be increased.

In carrying out my invention I boil the amino-compound with a solution of sodium cyanide and while warm I add sodium chloride and sodium carbonate, or sodium acetate. I pour into the mixture a diazotized base, as for example, diazotized benzidine, tolidine, or dianisidine. The smell of hydrocyanic acid disappears and the crystals of the dyestuff are immediately formed. After filtration the color is dried.

The proportions used are molecular, depending on the formula of the dye. The direct colors are very good to washing, and the fastness to light increases with the treatment of sodium cyanide. The colors are very soluble in water.

In my Patent No. 1,609,793, issued December 17, 1926, I gave a probable formula of the blue disazo dyestuff, but instead of benzidine, if, for an example I put tolidine and for the amino-compound I put 2-amino-8-naphthol-6-sulphonic acid, with the sodium cyanide treatment, I will have:

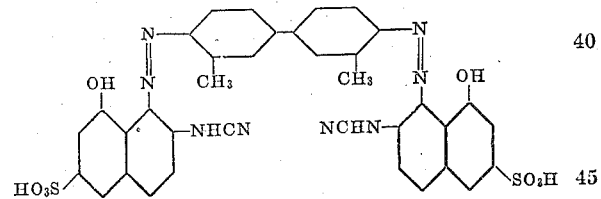

In this case the proportion used is 1 mole of tolidine and 2 moles of 2-amino-8-naphthol-6-sulphonic acid.

I claim:

1. A new series of azo dyestuffs having probably the following general formula:

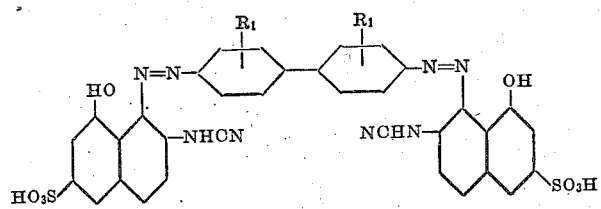

wherein $R_1$ stands for H, $CH_3$, or $CH_3O$.

2. As a new dyestuff, the compound of the following formula:

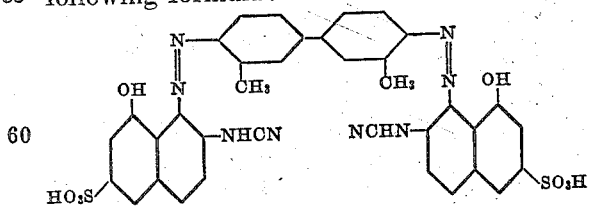

3. The process of preparing a dyestuff, which consists of coupling tetrazotized tolidine with 2-amino-8-naphthol-6-sulfonic acid in the presence of sodium cyanide.

PIO CACCIA.